Sept. 20, 1932.   A. ABRAMSON   1,878,749
VALVE
Filed Nov. 6, 1930
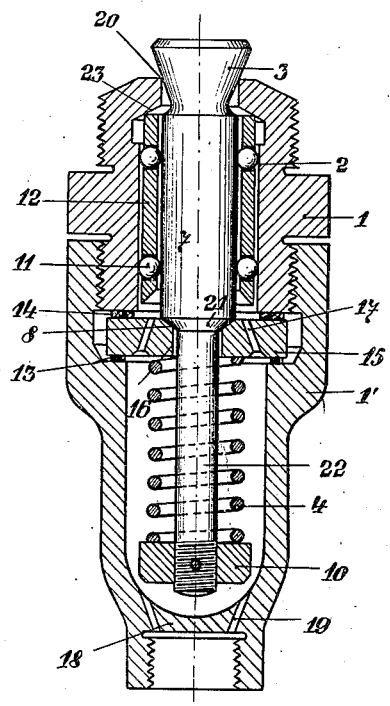
Inventor
A. Abramson,
By Marks Clerk
Attys.

Patented Sept. 20, 1932

1,878,749

UNITED STATES PATENT OFFICE

ALEXANDER ABRAMSON, OF PRAGUE, CZECHOSLOVAKIA

VALVE

Application filed November 6, 1930, Serial No. 493,890, and in Czechoslovakia December 3, 1929.

It is known to arrange the seating for a liquid controlled, inwardly opening conical fuel inlet valve for internal combustion engines on the inner edge of an opening provided in the floor of the valve body, in such a manner that the tapering part of the valve cone is surrounded by the wall of the opening of the valve body at a certain distance. Through the space which is formed when the valve opens between the valve and the seating, the fuel enters and is conducted along the wall of the opening of the valve body into the working cylinder of the internal combustion engine.

The object of the invention is to improve this apparatus in such a manner that the valve cone acts as an atomizer for the annular film of fuel. This advantage is obtained by the valve body being directly cut away on the narrow valve seating surface at the top, so that the valve cone stands away from the extended part of the valve body.

The invention also relates to means for keeping the surface of the valve cone smooth and also to cause a completely axial lifting of the valve cone from its seating.

The first mentioned effect is achieved by this that the valve cone is provided with a guiding bolt line in the boring of the valve body which bears against a part constructed as a valve cone on a seating in the boring of the valve body, so that the actual atomizing valve is largely freed from load. The cone of the hot atomizing valve can therefore not suffer any deformation on account of the seating of the cone valve body.

The lifting of the atomizing valve in completely axial direction is achieved by this that the guiding bolt of the atomizer valve is guided by rolling members on the wall of the boring of the valve body, so that the guiding bolt must always take a position coinciding with the axial direction of the boring in the valve body.

A constructional example of the fuel inlet valve is illustrated in section in the accompanying drawing.

The valve body consists of two sleeves 1, 1' one screwed within the other. Between the inner end of the sleeve 1 and an inner shoulder 13 of the sleeve 1' a disc 15 is held fast, packing rings 14 being interposed. The disc 15 has a central hole 16 the upper edge of which is formed as a valve seating 8. The disc 15 is also provided with borings 17 which connect the interior of the sleeve 1' with the interior of the sleeve 1. Near the end of the sleeve 1' to which the inlet tube for the liquid fuel, which is not shown on the drawing, is attached, there is a cross wall 18 with borings 19 through which the liquid fuel passes into the interior of the sleeve 1' and from there through the borings 17 of the disc 15 into the interior of the sleeve 1.

The interior of the sleeve 1 is made in the form of a boring 2 with smooth walls, which is narrowed at its outer end, and at its outer edge 20 is formed as a narrow valve seating surface. The outer edge of the valve seat does not reach the larger base of the valve cone. The conical fuel inlet valve 3 thus stands away from the valve body.

With the valve cone 3 is connected a guiding bolt 7 which passes through a part constructed as a valve cone 21 into a narrower bolt 22. The valve cone 21 bears on the valve seating 8 of the disc 15 while the narrower bolt 22 passes through the hole 16 of the disc 15. Between the disc 15 and a nut 10, screwed on to the end of the bolt 22, a spring 4 wound about the bolt 22 is held in a compressed state in order to keep the valve cones 3 and 21 pressed against their seatings 20 and 8, the valve cone 21 however taking a large part of the closing pressure.

In the bearing 2 of the sleeve 1 a cage 12 is loosely disposed, which is provided with balls 11 which fit exactly between the bolts 7 and the wall of the boring 2 and which are somewhat greater in diameter than the thickness of the wall of the cage 12.

In the state of rest this cage 12 will rest on the disc 15. The liquid fuel entering the sleeve lifts the cage so that it lies against the inner shoulder 23 of the sleeve 1. When the engine is running, the cage 12 follows the small axial movements of the valve stem, so that it only lies against the disc 15 when the engine is not running.

The fuel introduced under pressure acts on the vertical cone 21 and on the part of the valve cone 3 projecting below the seating surface 20, so that the latter is lifted from its seating towards the interior of the working cylinder to an extent which is too small to be shown on the drawing. In this way the fuel is permitted to pass out of the valve body 1, 1' into the working cylinder of the engine, the fuel reaching the part of the valve cone serving as atomizing member in the form of an annular film. The fuel spraying out of the small annular slot formed between the narrow valve seating of the valve body and the unseated valve in the form of a film has an axial direction and will strike against the wider exposed part of the valve cone and will be atomized.

What I claim is:

A periodic fuel injecting valve having a valve body, a narrow valve seating thereon and a conical valve, the widening part of which stands away free from the outer edge of the valve seat, a guiding bolt on the valve, rolling members in the sleeve of the valve body for guiding the bolt and a cage bearing these rolling members and slidably arranged in the said sleeve.

In testimony whereof I have signed my name to this specification.

ALEXANDER ABRAMSON.